G. A. GHENT.
SCRAPER AND LEVELER.
APPLICATION FILED APR. 17, 1920.
1,396,038.
Patented Nov. 8, 1921.
2 SHEETS—SHEET 2.
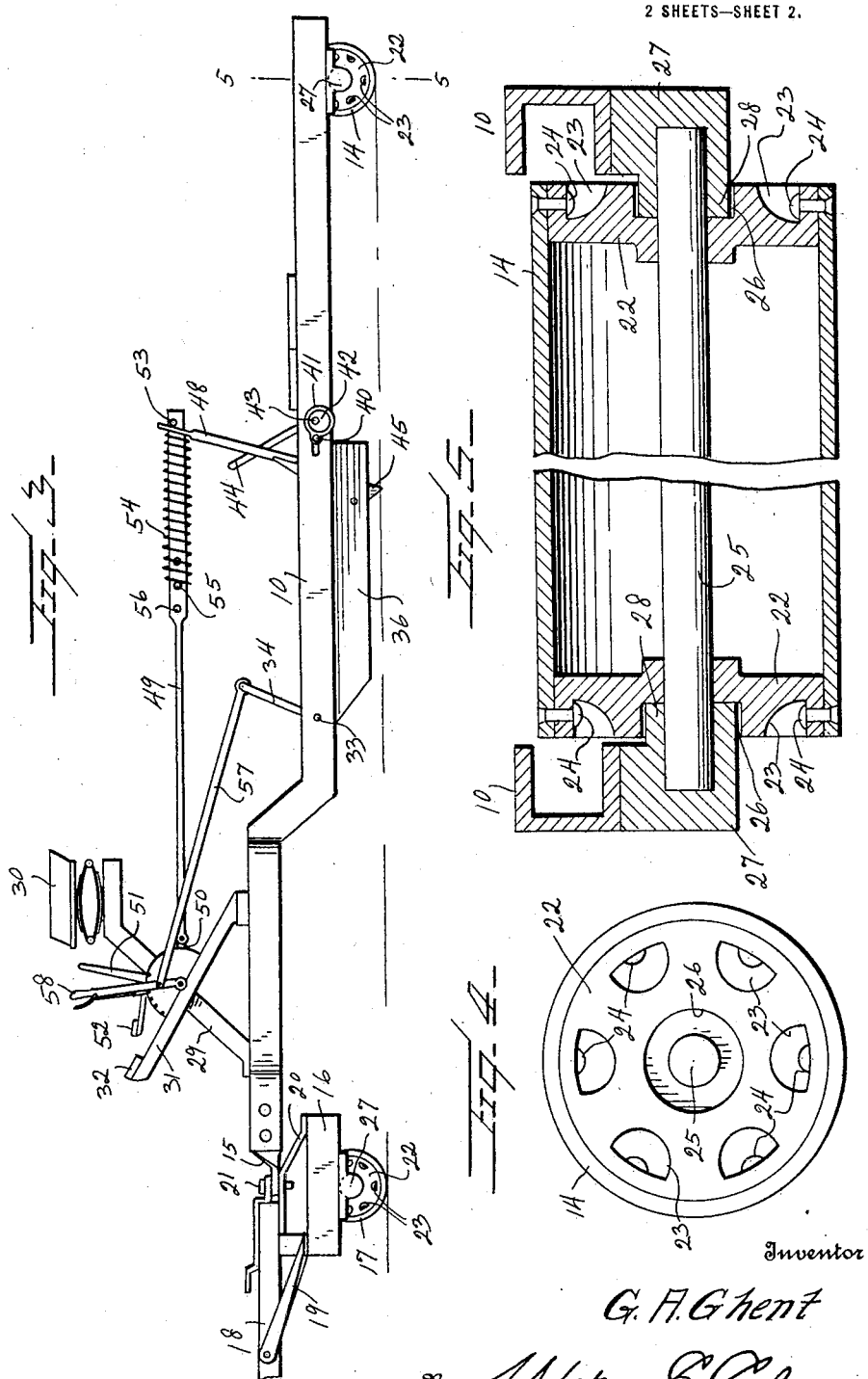
Inventor
G. A. Ghent
By Watson E. Coleman
Attorney

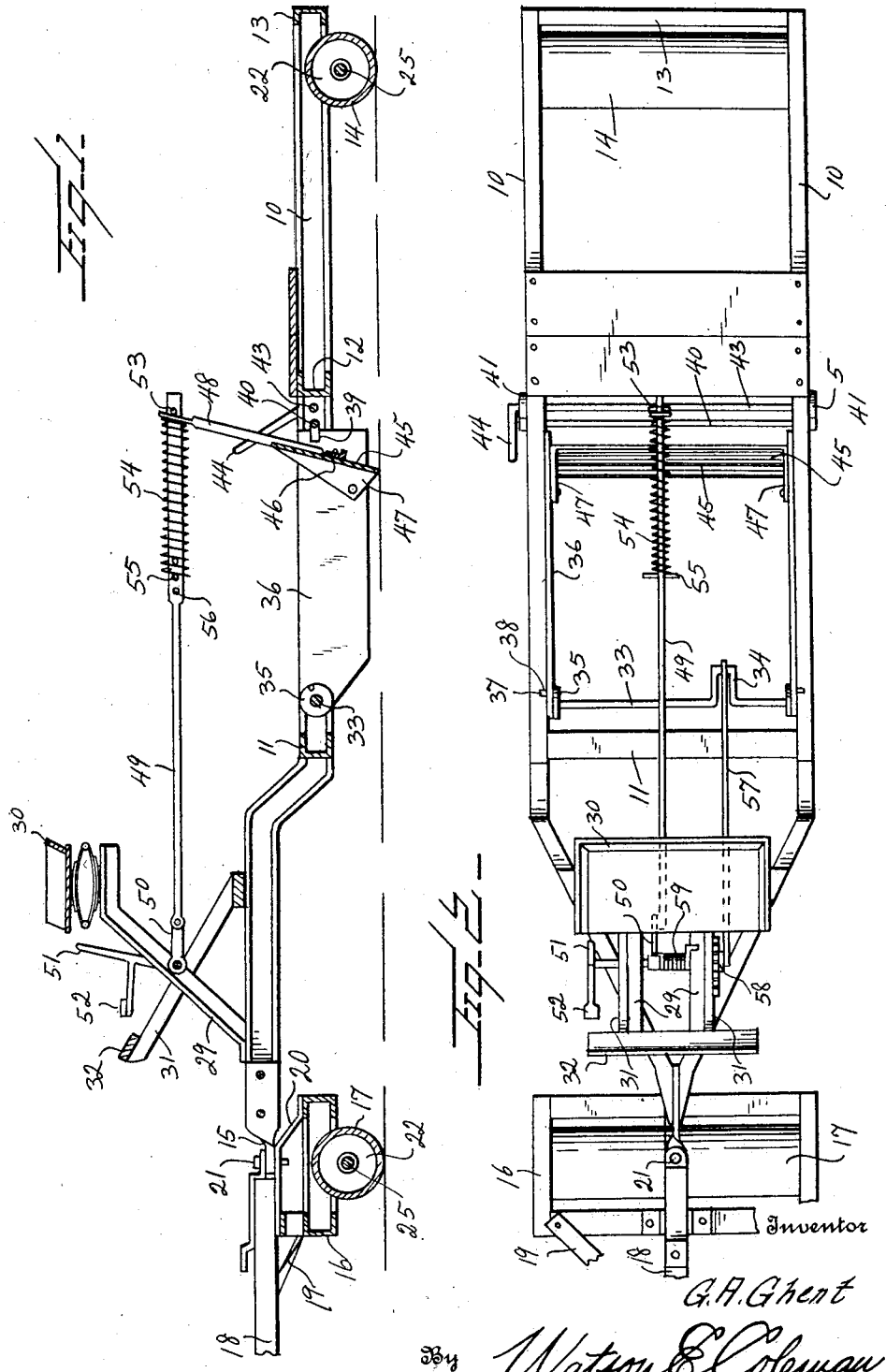

UNITED STATES PATENT OFFICE.

GEORGE A. GHENT, OF BUHL, IDAHO.

SCRAPER AND LEVELER.

1,396,038.  Specification of Letters Patent.  Patented Nov. 8, 1921.

Application filed April 17, 1920. Serial No. 374,647.

*To all whom it may concern:*

Be it known that I, GEORGE A. GHENT, a citizen of the United States, residing at Buhl, in the county of Twin Falls and State of Idaho, have invented certain new and useful Improvements in Scrapers and Levelers, of which the following is a specification, reference being had to the accompanying drawings.

This invention relates to earth working machines, and particularly to means for leveling or grading land.

The general object of the invention is to provide a very simple machine designed for the purpose of leveling land by scraping off the soil in high places and carrying the soil to low places, and at the same time rolling the land to break up clods and level the surface after the scraper has passed.

A further object is to provide certain improvements on the construction illustrated in my pending application for patent, Serial #281,721, filed March 10, 1919, which will make the machine more effective and more convenient to operate.

A further object is to provide a machine of this character with a scraper so mounted that it may be readily lifted out of operative position or lowered into operative position, and further to so mount the blade of the scraper that it will yield if it comes in contact with a boulder or stone and to permit it to pass over the boulder or stone, and then will immediately return to its original position.

A further object is to provide a construction of this character which is adapted to be used on very rough ground or on ground which is not so rough, and in which the adjustments may be changed to suit conditions of the ground of which the machine operates.

A further object is to provide means whereby the scraper may be locked from any upward movement in operating over very rough ground.

Other objects will appear in the course of the following description.

My invention is illustrated in the accompanying drawings, wherein:—

Figure 1 is a longitudinal sectional view of a scraper and leveler constructed in accordance with my invention;

Fig. 2 is a top plan view thereof;

Fig. 3 is a side elevation thereof;

Fig. 4 is an end elevation of one of the rollers;

Fig. 5 is a section on the line 5—5 of Fig. 3.

Referring to these drawings, it will be seen that the frame of my scraper comprises the channel irons 10 which, for the greater portion of their length, extend parallel to each other, but are converged at their forward ends. These channel irons are connected by transverse channel irons 11, 12 and 13 or any other suitable transverse braces may be used. The rear end of the frame is supported by a roller 14, and the forward end of the frame is also supported by a truck pivotally connected to the forward end of the frame, as will be later described. The forward ends of the longitudinal supporting beams 10 are upwardly inclined and then extend forward in a horizontal plane and convergently, and the forward end of this main frame is provided with any suitable shackle 15. The forward supporting truck comprises a rectangular frame 16 which may be of channel iron or other suitable material, and carries a transversely extending roller 17. The roller 14 and the roller 17 are of peculiar construction, and are mounted in bearings, as will be later stated.

Supported upon this truck frame 16 is a tongue 18 connected by braces 19 to the main frame and by a rearwardly extending brace 20. A king bolt 21 connects the rear end of the tongue to the shackle 15 in a manner which is obvious from the drawings, and permits the front truck to swing to any desired angle or "cut under" the forward end of the main frame.

The rollers 14 and 17 are constructed in the same manner, and, therefore, a description of the roller 14 will apply to the roller 17. This roller 14 is formed of a section of iron pipe and at its ends this section of pipe is closed by heads 22 which fit within the ends of the pipe, these heads upon their outer surfaces being cut away, as at 23, to permit rivets 24 to be passed through the ends of the iron pipe and into the heads, and have their inner ends overturned. Each of the heads 22 is annular in form to provide for the passage of the shaft or axle 25 for the roller, and the outer face of each head is countersunk, as at 26. Attached to the longitudinal beams 10 are bearings 27 comprising a base and a cap-like portion 28 which receives the end of the shaft 25 and which fits into the countersink 26, thus preventing dust, mud, dirt or other foreign matter from getting into the bearings. In other words, these bearings are blind bearings, as will be obvious from Fig. 5. The shaft of the roller 17 is also supported in like bearings 27.

Mounted upon the convergent ends of the beams 10 are the upwardly extending seat supporting angle irons 29 carrying a seat 30, and braced by the upwardly extending braces 31 carrying the foot board 32. This seat is preferably a spring seat something similar to the common wagon seat and preferably wide enough for two men.

Extending transversely of the frame formed by the members 10 and rotatably mounted in these members 10 is a crank shaft 33 having an upwardly extending crank 34, and at its ends carrying disks 35. Pivotally swinging on these disks are the rearwardly extending scraper supporting members 36, and the disks 35 have outwardly projecting pins or like members 37 which extend through openings in the members 36 and which normally rest in notches 38 in the frame beams 10 so as to prevent the depression of the members 36 beyond a certain point, but permitting the lifting up of these members 36. The rear end of the members 36 are notched, as at 39, and means is provided for engaging these notches and thereby preventing any movement of the members 36. Such a means is illustrated in the drawings as a transverse rod or bolt 40 carried in eccentric rings 41, these eccentric rings surrounding the eccentrics 42 mounted on a transverse shaft 43, which shaft is connected to a lever 44 or like means whereby the shaft may be rotated and the rod 40 inserted into or withdrawn from the sleeves 39. Swingingly mounted upon the rear ends of the members 36 is the scraper 45. The blade of this scraper is reinforced by an angle iron 46, and at its ends the scraper blade is flanged, as at 47, and the lower ends of these triangular flanges are pivoted to the members 36. The scraper carries an upwardly extending arm 48, the upper end of which is formed with a perforation through which passes the rear end of a rod 49. This rod 49 extends to a position beneath the seat and is there connected to a crank shaft 50 by which the rod may be reciprocated. This crank shaft 50 has an operating lever 51 formed with a pedal 52 and may operate over a rack, if desired, whereby the lever may be held in any adjusted position. The rod 49 passes loosely through a perforation or eye in the upper end of the arm 48 so that the rod would normally slide through this eye, but in order to prevent sliding movement in one direction, a pin 53 passes through the extremity of the rod, and on the opposite side a spring 54 is carried around the rod and bears against a pin 55 extending through the rod. This pin 55 may be adjusted in any one of a plurality of openings 56 in the rod. Thus, the tension of the spring may be adjusted.

By means of the lever 51, the blade may be rocked. The crank shaft 34 is connected by a link 57 connected to a lever 58 pivotally mounted beside the support for the driver's seat. When this lever 58 is shifted forward, it will rotate the crank 34, thus causing the lifting of the rear ends of the blade carriers 36 and the lifting up of the blade. This lever operates over a rack, and when the lever is thrown rearward to its full extent, it acts to hold the members 36 down and the blade in its cutting position. Now if the blade strikes a stone which would tend to break it, the blade will rotate on its pivot and the arm 48 will move forward relative to the rod 49 against the action of the spring 54, and then when the obstruction is passed, the blade will spring back to its set position. A spring 59 connected to the lever 51 acts to return the lever and the scraper to their original positions. Preferably this is a coiled spring surrounding the shaft 50 between the seat support and the crank.

In the use of this construction on moderately uneven ground, the members 36 are forced downward to their fully depressed position by operating the lever 58, and the blade is inclined at any desired angle by adjusting the lever 51. When, however, the machine is operating over very rough ground, the pin 53 is removed and the rod 49 disconnected and a piece of pipe having a suitable length is slipped over the arm 48. Behind the blade there is a platform mounted upon the frame upon which one or two men may stand who can operate the lever 48 by means of the pipe slipped over it and hold the blade to its work.

When it is desired to move the machine from place to place without scraping, the lever 58 is operated to lift the members 36 and thus lift the blade out of position. For very rough and heavy work the members 36 may be held down by the eccentrically operated bolt 40 or other means.

It is to be noted that the frame of this machine is mounted on top of the rollers and this clears the ground at all times when the device is in operation, and, therefore, permits the machine to be operated much easier than if the sills or beams 10 came in contact with the ground. The members 36 will be disposed so that the upper edges will be flush with the upper edge of the frame and the lower edges of the members 36 will be about 3" from the ground. The scraper blade will be about 20" wide and will extend about 3½" above the main frame. Of course, I do not wish to be limited to the use of single rollers at the front and rear, as double rollers might be used in an obvious manner. The main frame will be about from 6 to 8' and may have any desired width, and the rollers under normal circumstances will be about 16" in diameter.

While I have illustrated the preferred form of my invention, I do not wish to be limited to the details of construction, as it is obvious that many changes might be made therein without departing from the spirit of the invention.

I claim:—

1. An earth working machine of the character described including a frame, rotatable members supporting the frame from the ground, blade supports pivoted to the frame on each side thereof for vertical movement, a blade carried by said blade supports and vertically movable therewith, means for rocking the blade supports to thereby raise or lower the blade, the blade being pivotally connected to the blade supports for independent oscillation on its own axis, and means whereby the angle of the blade may be adjusted.

2. An earth working machine of the character described including a frame, rotatable members supporting the frame from the ground, blade supports pivoted to the frame on each side thereof for vertical movement, a blade carried by said blade supports, means for oscillating the blade supports to thereby raise or lower the blade, the blade being pivotally mounted upon the blade supports for independent oscillation around its longitudinal axis in a vertical plane, and means whereby the angle of the blade may be adjusted, said means permitting the blade to rock in a direction to carry the lower edge of the blade rearward and upward.

3. An earth working machine of the character described including a frame, rotatable members supporting the frame from the ground, blade supports pivoted to the frame on each side thereof for vertical movement, a blade carried by said blade supports, means for oscillating the blade supports to thereby raise or lower the blade, said blade being pivoted to the blade supports for oscillation in a vertical plane and having an upwardly extending arm, a lever mounted upon the main frame, a rod operatively connected to the lever to be reciprocated thereby and passing through an eye on said arm, a stop on the extremity of the arm against which the eye normally abuts, and a spring carried by said rod and bearing against the opposite side of said eye from said stop.

4. An earth working machine of the character described including a frame, rotatable members supporting the frame from the ground, blade supports pivoted to the frame on each side thereof for vertical movement, a blade carried by said blade supports, means for oscillating the blade supports to thereby raise or lower the blade, said blade being pivoted to the blade supports for oscillation in a vertical plane and having an upwardly extending arm, a lever mounted upon the main frame, a rod operatively connected to the lever to be reciprocated thereby and passing through an eye on said arm, a stop on the extremity of the arm against which the eye normally abuts, and a spring carried by said rod and bearing against the opposite side of said eye from said stop, said spring being adjustable as to tension.

5. An earth working machine of the character described comprising a supporting frame having a roller at its rear end, a truck pivotally connected to and supporting the forward end of the frame and adapted to be turned into angular relation thereto and having draft appliances, scraper blade supports pivotally connected to the frame for vertical movement, a blade carried by the free ends of said supports and pivoted thereto for rocking movement in a vertical plane, a seat mounted upon the forward end of the main frame, means disposed adjacent said seat whereby the blade supports may be raised or lowered, and means disposed adjacent said seat whereby the scraper blade may be rocked on its pivots.

6. A machine of the character described including a main frame, a transversely extending roller supporting the rear end of the main frame, a truck pivoted to and supporting the forward end of the main frame, a roller supporting said truck, draft devices carried by said truck, blade supporting members pivotally connected to the main frame adjacent the sides thereof for vertical movement, a blade operatively pivoted to the supports whereby the blade may be swung in a vertical plane, and manually operable means for raising or lowering the blade supports and rocking said blade.

7. A machine of the character described including a roller supported main frame, blade supporting members pivotally connected to the main frame adjacent the sides thereof for vertical movement, a blade operatively pivoted to the blade supports whereby the blade may be swung in a vertical plane to change its cutting angle, a shaft carrying said blade supports and having operative engagement therewith and formed with a crank, a lever, a link connecting the crank to the lever, an arm extending upward from the blade and having an eye at its upper end, a shaft having a lever and formed with a crank, a rod connected to the crank and extending through said eye and having a stop at its outer end normally abutting against the eye, and a spring carried by said rod and normally bearing against the upper end of the arm.

In testimony whereof I hereunto affix my signature.

GEORGE A. GHENT.